United States Patent
Jenko et al.

[11] Patent Number: 6,043,466
[45] Date of Patent: Mar. 28, 2000

[54] HOT RUNNER HEATING CLAMP

[75] Inventors: Edward Joseph Jenko; Harold Godwin, both of Ontario, Canada

[73] Assignee: Husky Injection Molding Systems Ltd., Canada

[21] Appl. No.: 09/027,076

[22] Filed: Feb. 20, 1998

[51] Int. Cl.[7] .................................. A05B 3/58; E03B 7/10
[52] U.S. Cl. ............................................. 219/535; 138/33
[58] Field of Search ............................ 219/535; 138/33; 104/279; 285/21

[56] References Cited

U.S. PATENT DOCUMENTS

| | | | |
|---|---|---|---|
| 3,789,188 | 1/1974 | Rudbarg | 219/301 |
| 3,829,657 | 8/1974 | Hinz | 219/535 |
| 3,849,630 | 11/1974 | Halliday | 219/535 |
| 4,132,578 | 1/1979 | Gell, Jr. . | |
| 4,268,241 | 5/1981 | Rees et al. . | |
| 4,770,442 | 9/1988 | Sichler | 285/21 |
| 4,968,247 | 11/1990 | Olson . | |
| 5,113,576 | 5/1992 | Van Boekel et al. . | |
| 5,169,176 | 12/1992 | Brossard | 285/21 |
| 5,263,230 | 11/1993 | Johnson . | |
| 5,360,333 | 11/1994 | Schmidt . | |
| 5,364,130 | 11/1994 | Thalmann | 285/21 |
| 5,411,392 | 5/1995 | Von Buren . | |
| 5,558,888 | 9/1996 | Beck . | |
| 5,591,367 | 1/1997 | Schwarzkopf | 219/535 |
| 5,632,919 | 5/1997 | MacCracken et al. | 219/494 |
| 5,667,712 | 9/1997 | Sutorius et al. | 219/535 |
| 5,798,504 | 8/1998 | Schwarzkopf | 219/550 |
| 5,883,364 | 3/1999 | Frei et al. | 219/535 |

FOREIGN PATENT DOCUMENTS 1290012  9/1972  United Kingdom .

*Primary Examiner*—Teresa Walberg
*Assistant Examiner*—Daniel Robinson
*Attorney, Agent, or Firm*—Bachman & LaPointe, P.C.

[57] ABSTRACT

A system for clamping an object, such as a heater, to a cylindrical member, such as a nozzle or a hot runner channel is described. The system has at least one deformable elastic member for applying a clamping force to the object so as to hold the object against an outer surface of the cylindrical member and an annular sleeve for compressing the at least one deformable elastic member and for directing the clamping force radially inwardly toward the cylindrical member. The deformable elastic member, in one embodiment, is formed by a spring member which surrounds the object and the cylindrical member. In an alternative embodiment, the deformable elastic member comprises a plurality of hollow tubes surrounding the object and the cylindrical member, which tubes are hollow, thin walled, and elastic. The annular sleeve is preferably formed from a material having a thermal expansion coefficient less than the thermal expansion coefficient of the material forming the cylindrical member. Thus, as heat is applied, the cylindrical member expands more than the outer sleeve causing compression of the deformable elastic member(s) and direction of the clamping force towards the object to be held against the cylindrical member. A method for using the clamping system of the present invention is also described.

22 Claims, 8 Drawing Sheets

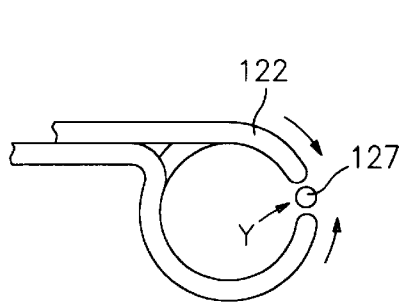
FIG. 7B
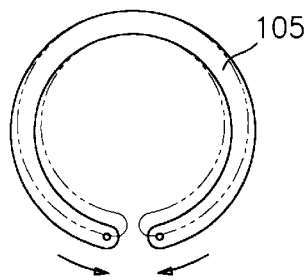
FIG. 10
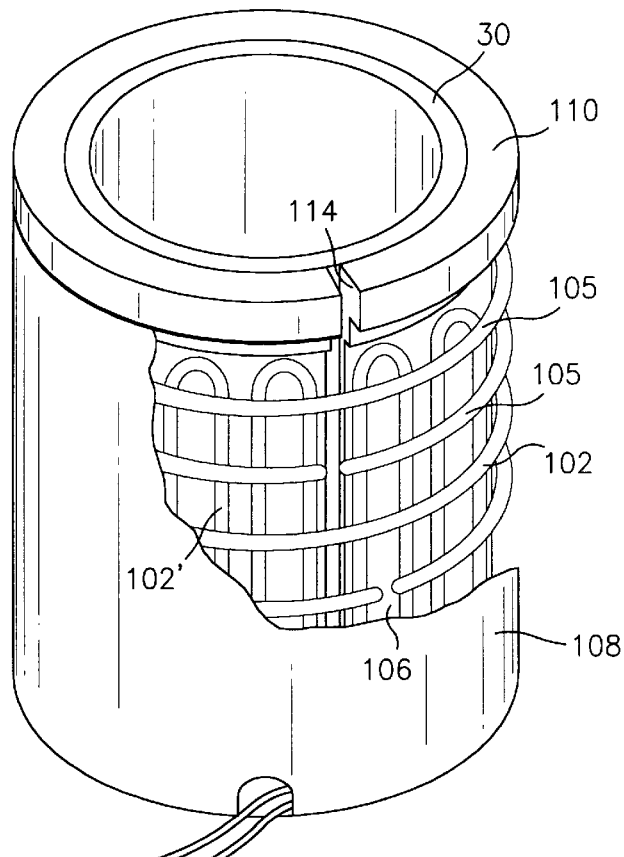
FIG. 3B
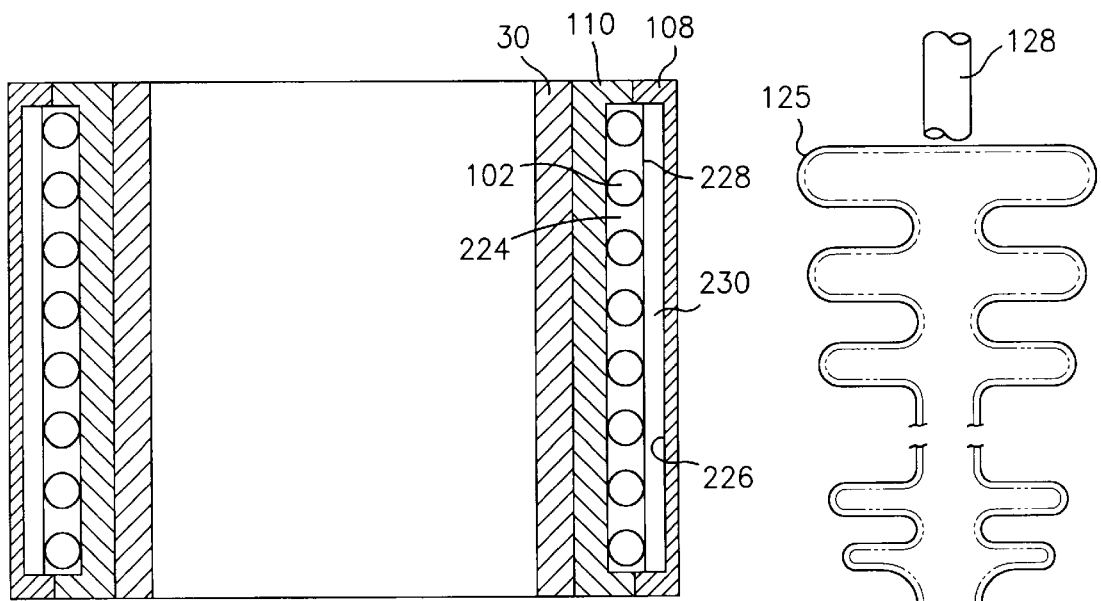
FIG. 8A
FIG. 7C

HOT RUNNER HEATING CLAMP

BACKGROUND OF THE INVENTION

The present invention relates to an improved removable system for clamping an object, such as a heater or a sensor or both, to a cylindrical member, such as a nozzle or hot runner channel, in injection molding equipment and to a method for applying a force for clamping an object to a cylindrical member.

Heat generation and management of the molten material represents one of the most critical aspects in an injection molding process. Heating of the molten material that travels through the mold manifold and hot runner nozzles is accomplished using various phenomena, techniques and components. The methods and the devices for heating the molten material have to meet stringent design and process constraints that are specific to the injection molding process, to the molten material to be processed, and to the type of article to be molded.

Electrical heating represents the most popular heating method and various electrical heaters have been developed for manifolds and hot runner nozzles. In this regard, coil heaters, band heaters, and cartridge heaters, that can be sometimes embedded or integrated in the nozzle housing, can be mentioned. Integrated electrical heaters are very expensive, very difficult to manufacture, and impossible to replace, unless one sacrifices the entire nozzle. In many instances, it is preferable to use removable electrical heaters that are less expensive, can be easier manufactured, assembled, tested, and serviced. One major problem that has not been solved satisfactory so far is related to the clamping of the heater to the element to be heated so that an intimate thermal contact is established with minimal heat loss.

Several clamping techniques have already been developed but there is still a need for improved removable clamping methods and devices so that the heater is more compact, more easily attached and detached, made of simpler and more reliable components that do not lose their properties in time, and provide an enhanced thermal contact with the element to be heated.

Generally, there are four main design concepts or types used to removably attach a heater to the manifold or nozzle housing of a hot runner nozzle. For example, there are so called "clampless" heaters which do not have a clamp mechanism per se, but instead rely on an extremely precise fit between the heater and the nozzle, thus requiring no extra clearance other than for the outer diameter of the heater. Aside from the high cost of manufacturing both fitting diameters, there are additional drawbacks. For example, it can become necessary to engineer additional devices to trap the heater on the nozzle to prevent it from slipping axially away from its installed position during handling or movement of the mold. These heaters also tend to have a thick wall section, on the order of 4 mm for heaters with a 12–42 mm internal diameter. Also, should any burrs or surface imperfections exist on the mating surfaces, the heater can seize on the nozzle and become very difficult to remove without damage to the heater or the nozzle.

The mechanical clamping techniques use fastening means and specialized tools to attach and detach the electrical heater. To obtain effective and efficient heat transfer from the heater to the heated part, it is necessary to have close contact between them. This is generally accomplished by use of a clamping device such as a metal shroud which encompasses the heater body and is screwed together at its ends to draw the heater tighter against the nozzle to be heated. This method has an advantage of being simple, using common tools such as a screw driver to tighten or loosen the heater. However, in cases where the heater must be installed in a confined area, it can be difficult to access the screw head for tightening purposes once it is in its correct orientation in the molding machine. Typically, the obstruction is the mold plate adjacent to and surrounding the heater. In such cases, additional clearance is often machined into the plate to permit the tightening tool to reach the screw head. In situations where it is prohibitive to add clearance machining because it will compromise the strength of the mold plate or reduce the plate material available to back-up and support other mold components, a design such as that shown in U.S. Pat. No. 4,968,247 to Olson and U.S. Pat. No. 5,263,230 to Johnson may be used to permit tightening of the heater by way of a cam actuated clamp housing. This type of design permits a tool to approach from the axial direction of the heater, thus requiring no special clearance for the tightening tool. While this is an improvement for ease of assembly and structural integrity of the mold plate, there is still the need to cut a small pocket of clearance for the cam mechanism which stands outside of the cylindrical profile of the outer surface of the heater. Likewise, there is a variety of other tightening devices available for use on the market, which also invariably add substantially to the outer diameter of the heater. Further reference is made to U.S. Pat. No. 4,268,241 to Rees, which shows another way to clamp the heater using a threaded sleeve.

The so called "flexible" clamping methods use variable deformable, spring-like or elastic elements to apply a clamping force upon the heater and keep it in intimate thermal contact with the melt channel of the manifold or nozzle housing. Reference is made in this regard to U.S. Pat. No. 5,411,392 to Van Buren. The Van Buren '392 clamp is successfully applicable to band or sheet heaters having spring like characteristics. The slot in the heater that provides the expansion feature also reduces the heat on a certain portion of the nozzle. Van Buren '392 however is not recommended to clamp coil heaters. Other U.S. Patents, such as Rees '241 and U.S. Pat. No. 5,113,576 to van Boekel, show embodiments of electrical heater clamping elements where the mechanical elastic deformation created by a "wedge effect" at the interface between the heater and the nozzle is used to generate a less secure clamping force.

In the so called "thermal" clamping methods, the clamping force is generated by the different thermal expansion coefficients between the elements forming the heating system and/or the nozzle housing. Thermal clamping methods in most cases are implemented by using bimetallic elements in the construction of the heater. Reference is made in this regard to U.K. Patent No. 1,290,012 to Richardson, U.S. Pat. No. 4,132,578 to Gell, the '576 patent issued to van Boekel, U.S. Pat. No. 5,360,333 to Schmidt, and U.S. Pat. No. 5,558,888 to Beck. The thermal clamping force concepts disclosed by these patents largely depend on the temperature generated by the heater and to the difference in response of the materials exhibiting thermal expansion coefficients to the cycling temperature of the molding process.

It has been noticed that the "thermal" clamping methods using bi-metallic elements work properly only within a limited "temperature operating window". For example, the clamping design disclosed in the '333 patent to Schmidt, assigned to the assignee of the instant application, provides a good clamping force at temperatures below 500° F. This limitation is caused amongst others by factors that depend on the thermal behavior of the bi-metallic elements. In some cases, they may reach a thermal expansion plateau above certain temperatures. In other cases, their thermal expansion range may be diminished after a large number of molding cycles where the temperature goes from the cold to the hot conditions during the actual operation.

The current invention teaches a novel clamping method and system that overcome the problems of the known systems by providing a "flexible" and "thermal" clamping means to form a removable hybrid clamping system that operates efficiently at temperatures below and over 500° F.

More specifically, the current invention discloses a new "flexible" clamping means that generates sufficient clamping force in both cold and warm conditions, whether or not the thermal expansion of the elements forming the heater system contribute to the development of an additional clamping force in conjunction with the "flexible" clamping means.

SUMMARY OF THE INVENTION

Accordingly, it is an object of the present invention to provide a clamping system and method which uses elastic deformation means to generate the clamping force at cold and warm conditions, and where the clamping force could be further amplified, in some conditions, by thermal expansion means.

It is another object of the present invention to provide a clamping system as above which has improved thermal contact and minimal heat loss.

It is a further object of the present invention to provide a clamping system and method as above that lends itself to a broad range of nozzle and manifold geometries and sizes, that is operative for various processing conditions, and that does not require accurate and expensive machining of the parts.

It is yet a further object of the present invention to provide a clamping system and method as above which can also hold a sensor, in addition to a heater, in the same tight thermal contact with the heated nozzle or manifold.

The foregoing objects are attained by the clamping system and the method of the present invention.

In accordance with the present invention, the system for clamping an object, such as a heater, a sensor or both, to a cylindrical member, such as a nozzle or a hot runner channel, broadly comprises means for applying a clamping force to the object so as to hold the object against an outer surface of the cylindrical member, and means for limiting the expansion of the clamping force applying means in a first direction so as to amplify and redirect the clamping force for holding the object against the cylindrical member, with the expansion limiting means being in contact with the means for applying the clamping force. The clamping force applying means, in one embodiment, is formed by a flexible element, such as a spring member, which circumferentially surrounds the object and the cylindrical member. In an alternative embodiment, the clamping force applying means comprises a hollow flexible element surrounding the object and the cylindrical member, which hollow element is thin walled and, elastic. In yet another embodiment, the clamping force applying means may contain an expandable material such as a liquid or gas. The means for limiting the expansion of the clamping force applying means comprises, in a preferred embodiment, an annular sleeve surrounding the clamp force applying means. The annular sleeve is preferably formed from a material having a thermal expansion coefficient less than the thermal expansion coefficient of the material forming the cylindrical member. Thus, as heat is applied, the cylindrical member expands more than the outer sleeve causing additional increases in the clamp force applied by the flexible element.

The method of the present invention broadly comprises the steps of positioning a clamping system around the heater, applying a clamping force to the heater to hold it in position against a cylindrical member, amplifying the clamping force for holding the heater against the cylindrical member by limiting expansion of the clamping force applying means in a radially outward direction. The positioning step comprises positioning an annular sleeve about the heater, said annular sleeve preferably being formed from a material having a thermal expansion coefficient less than the thermal expansion coefficient of the material forming the cylindrical member and positioning at least one pre-loaded deformable member for applying the clamping force between the annular sleeve and the heater. The method further comprises applying heat to the cylindrical member, which heat causes the cylindrical member to expand a greater amount than the annular sleeve, thereby compressing the at least one deformable member so as to cause a radially inwardly directed clamping force for holding the heater in contact with an outer surface of the cylindrical member.

The method of the present invention makes use of two different aspects to operate under cold and warm conditions. First, the clamping force is generated by placing around the heater, a flexible clamping element maintained loaded/deformed by an expansion limiting means. This clamping force works in cold and warm conditions. The clamping force is further amplified in certain temperature conditions due to thermal expansion which causes at least a portion of the clamping force to be redirected towards the heater by the expansion limiting means. For some applications, the thermal expansion contribution to the clamping force is less significant because the elastic deformation is preloaded in such a manner as to provide a clamping force in both cold and warm conditions.

Other details of the clamping system and the method of the present invention, as well as other objects and advantages attendant thereto, are set forth in the following description and the accompanying drawings in which like reference numerals depict like elements.

BRIEF DESCRIPTION OF THE DRAWINGS

FIG. 3B is a perspective view of a fifth embodiment of a clamping system in accordance with the present invention;

FIG. 7B is an end view of the heater of FIG. 7A;

FIG. 7C is a top view of a portion of the heater of FIG. 7A prior to its assembly into substantially a C-shape configuration;

FIG. 8A illustrates still another embodiment of a clamping system in accordance with the present invention;

FIG. 10 is a top view of a hoop used in the embodiment of FIG. 3B.

DETAILED DESCRIPTION OF THE PREFERRED EMBODIMENT(S)

Figure 1:
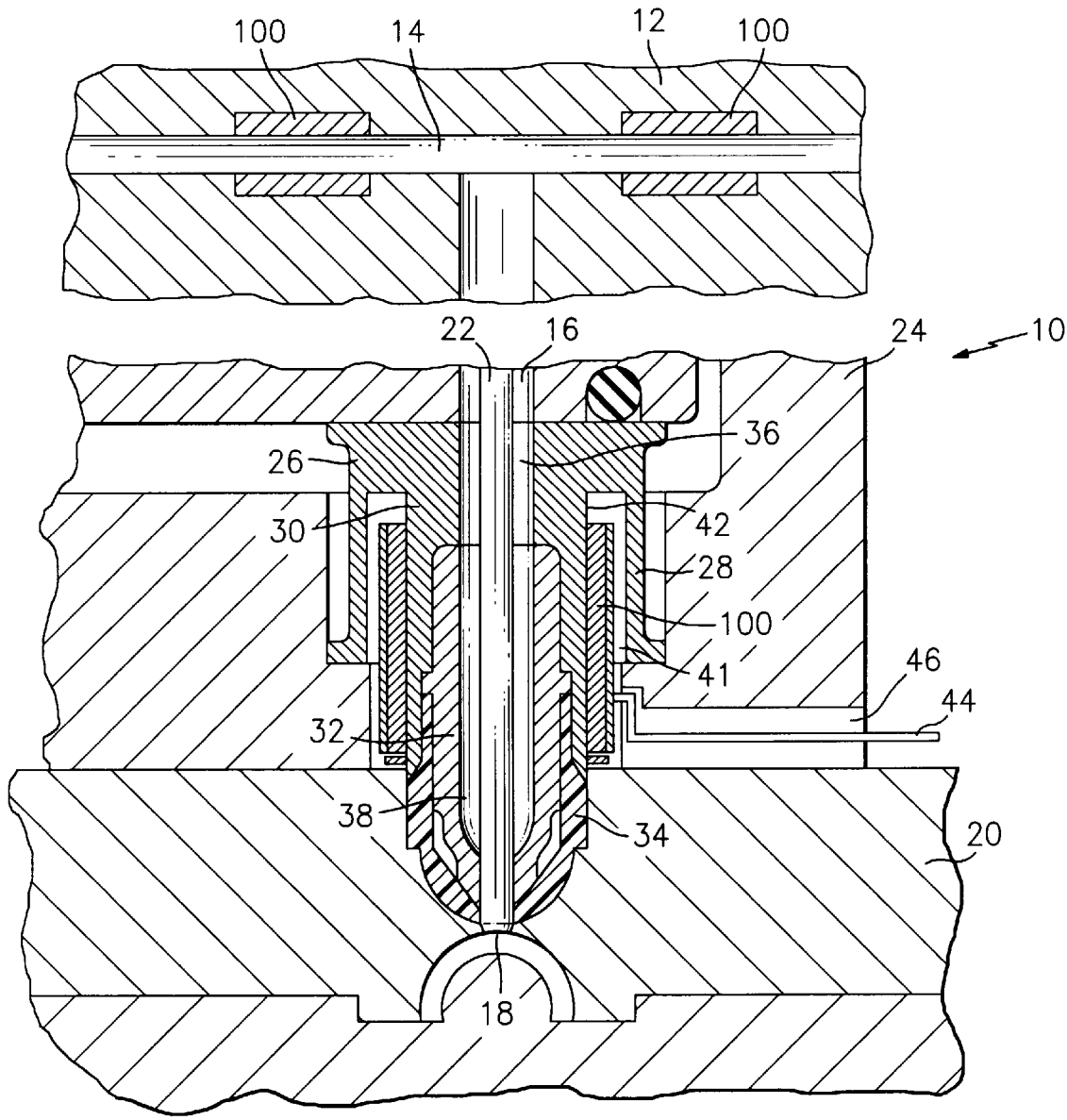
FIG. 1 is a sectional view of the nozzle portion of an injection molding machine having a hot runner system.

Referring now to the drawings, FIG. 1 illustrates a portion of a hot runner system 10 serving to supply liquified thermoplastic material from an injection unit (not shown) via a hot runner manifold 12 and a melt channel in hot runner nozzle 16 to a mold gate 18 in a mold plate 20. The flow of liquified thermoplastic material to the mold gate 18 may be shut off using any known technique in the prior art such as valve gating, thermal gating or a combination of both. In the embodiment of FIG. 1, the mold gate 18 is alternately opened and closed by a rod or pin 22 connected to a double acting piston (not shown). The piston for operating the rod or pin 22 does not form part of the present invention and may be any suitable piston known in the art for actuating such a valve rod. Alternatively, the gate 18 may not use a rod but rather rely on thermal separation for the opening and closing thereof.

A cooled intermediate or backing plate 24 is inserted between the mold plate 20 and the hot runner manifold 12. The backing plate 24 supports a nozzle 26 provided with an annular skirt 28 surrounding a tubular or cylindrical nozzle body 30. The nozzle 26, including the skirt portion 28 and the nozzle body portion 30, is formed from a material having a good thermal conductivity and a relatively high thermal coefficient of expansion. Preferably, the nozzle 26, and in particular the nozzle body portion 30, is formed from a material, such as copper or a copper alloy, which has a relatively high thermal expansion coefficient.

The tubular nozzle body 30 forms part of the hot runner system for supplying liquified thermoplastic material to the mold gate 18. The nozzle 30 has a nozzle tip 32 seated therein, which tip is formed from a highly heat-conductive material, such as a copper-beryllium alloy. The nozzle tip 32 extends into the mold plate 20 and serves, at least in part, as a guide for the free end of the valve rod 22.

An annular space existing between the end of the nozzle body 30, the tip 32 and the mold plate 20 is occupied by a sheath or sleeve 34. This sheath may be prefabricated from vespel, titanium or any ceramic. Alternatively, the sheath 34 can be formed from the overflow of injected plastic resin during the first operating cycle or cycles. The sheath 34 serves primarily as a thermal insulator.

As shown in FIG. 1, the tubular nozzle body 30 has an axial channel or upper nozzle channel 36 which forms part of the transfer channel 16. The nozzle tip 32 has a lower nozzle channel 38 that also forms part of the transfer channel 16 for conveying the molten thermoplastic material to the mold gate 18. When the mold gate 18 is closed by the rod 22, molten thermoplastic material resides in the channels 36 and 38. To keep this plastic material in a liquified state, a heater clamping assembly 100 such as that shown in FIGS. 2A–2C, including a heater 102, preferably in the form of a coil, is provided around a portion of the nozzle body 30. The heater clamping assembly 100 is positioned within a space 41 defined by the skirt 28, the backing plate 24, and the nozzle body 30. The heater clamping assembly 100 is generally in contact with the outer surface 42 of the nozzle body 30. An electric cable 44 passes through a passageway 46 in the backing plate and is connected to the heater 102 so that electrical power may be provided thereto. Additional electrical cables (not shown) can also be used so that a temperature sensor and/or other devices can be located and operated during the injection molding process.

While the invention will be described in the context of a heater assembly placed around a nozzle body, it should be recognized that the same heater assembly could be used elsewhere in an injection molding system. For example, in order to keep the thermoplastic material in a liquified state in the hot runner manifold 14 or in other channel means running from the injection unit (not shown), heater clamping assemblies 100 could also be placed around the hot runner manifold channel 14, as shown in FIG. 1.

In order to efficiently and effectively maintain the thermoplastic material in the channels 16 and/or 38 in a liquified state, it is important that good thermal contact be maintained between the heater 102 and nozzle body 30. To this end, the heater clamping assembly 100 includes means for clamping the heater 102 to the outer surface 103 of the nozzle body 30.

Figure 2A:
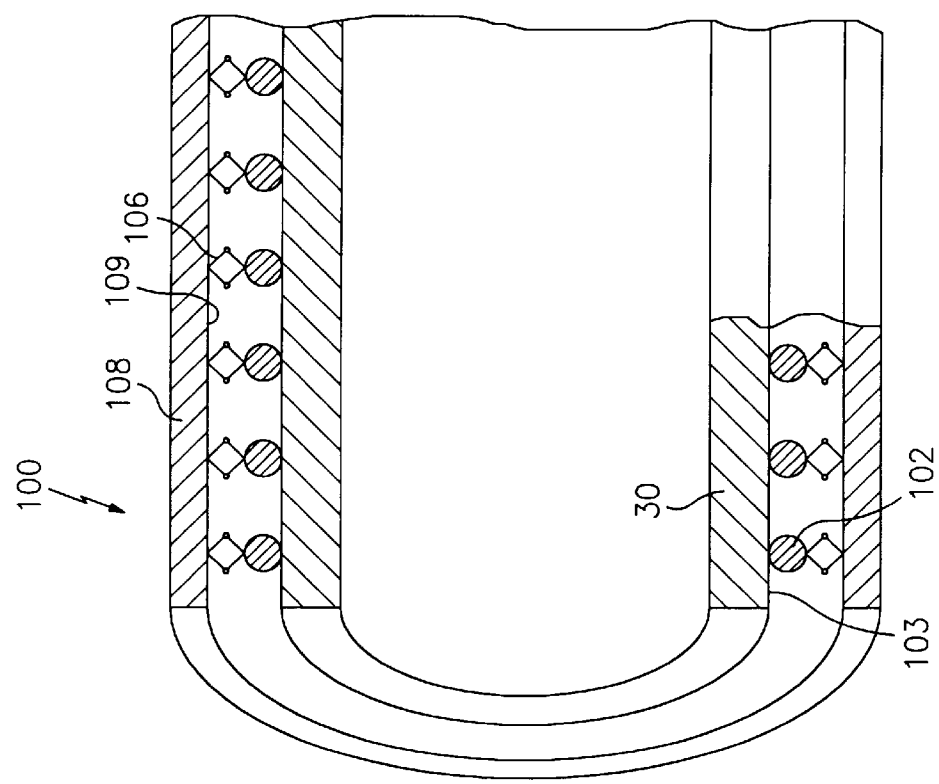
FIG. 2A is a sectional view of a first embodiment of a clamping system in accordance with the present invention.

A first embodiment of a clamping assembly 100 in accordance with the present invention is illustrated in FIG. 2A. As shown in this figure, a heater 102, preferably a coil heater, surrounds the nozzle body 30 and is in contact with the outer surface 103 of the nozzle body. The clamping assembly 100 for holding the heater 102 against the outer surface 103 is formed by a clamping force applying device or energizer 106 and an annular outer sleeve 108 in contact with the device 106. The outer sleeve 108 acts as a retaining element to compress or limit the expansion of the device 106 in a radially outward direction. By limiting the outward expansion of the device 106, one amplifies the clamping force applied by the device 106 and redirects it radially inwardly toward the heater 102 and the outer surface 103 of the nozzle body 30. As a consequence, there is an increased clamping force for holding the heater 102 in contact with the outer surface 103. This clamping assembly is particularly advantageous in cold conditions because it does not rely upon the application of heat and thermal expansion to hold the heater 102 in place.

The outer retaining sleeve 108 surrounding the device 106 is preferably formed from a metallic material having a thermal expansion coefficient less than the thermal expansion coefficient of the material forming the nozzle body 30. Suitable materials for the sleeve 108 include titanium, titanium alloys, stainless steels, and iron alloys. For high thermal insulation, sleeve 108 can be made of a suitable ceramic material.

Due to the differences in thermal expansion coefficients between material forming the sleeve 108 and the material forming the nozzle body 30, the application of heat to the thermoplastic material in the nozzle body 30 will cause the nozzle body 30 to expand more than the sleeve 108. As previously discussed, the ability of the device 106 to expand outwardly is limited by the inner surface 109 of the sleeve 108 which is in contact with the device 106. Thus, under warm conditions, at least a portion of the clamping force applied by the device 106 continues to be directed radially inwardly towards the nozzle body 30 and will serve to hold the heater 102 against the outer surface 103 of the nozzle body 30, creating good heat transfer from the heater 102 to the nozzle body 30.

For some applications and, particularly in cold conditions, the device 106 may be preloaded so that it applies a clamping force sufficient to hold the heater in good thermal contact with the nozzle body 30 even in the absence of any applied heat.

Figure 2C:
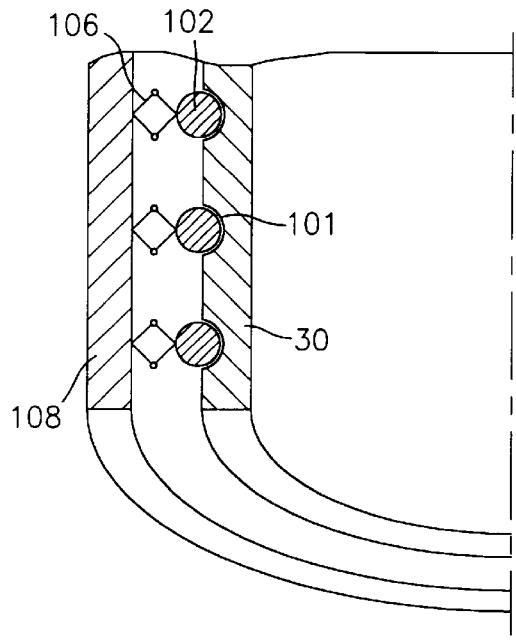
FIG. 2C is a sectional view of a third embodiment of a clamping system in accordance with the present invention.
Figure 2B:
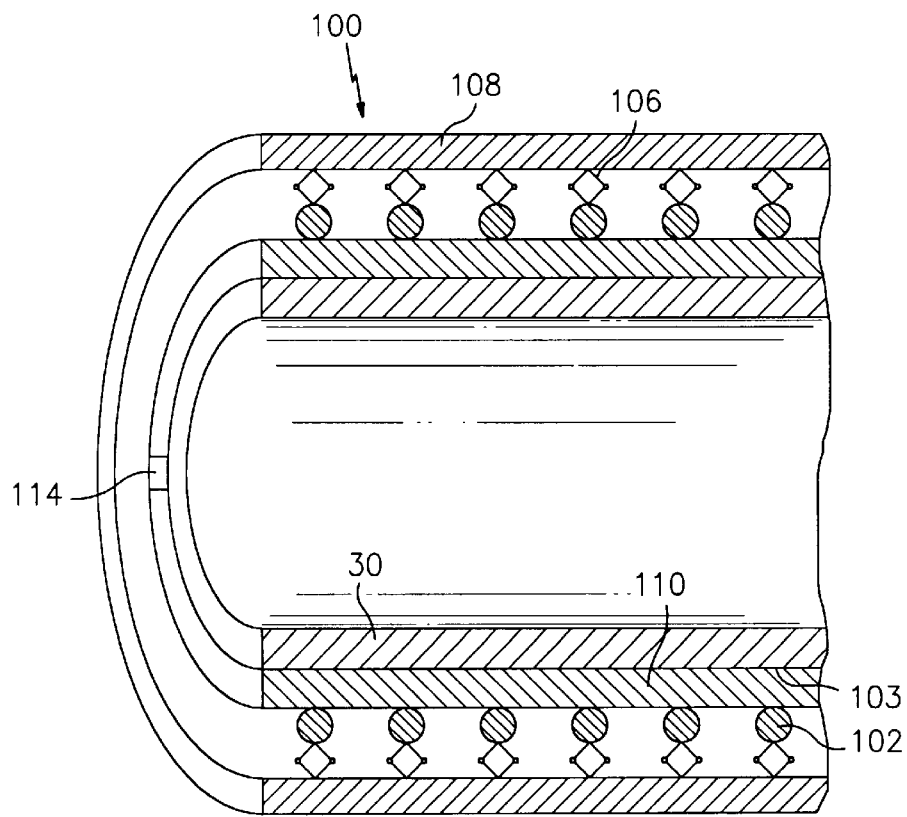
FIG. 2B is a sectional view of a second embodiment of a clamping system in accordance with the present invention.

A second embodiment of a heater clamping assembly 100 is shown in FIG. 2B. In this embodiment, the heater clamping assembly 100 includes four components. In addition to the heater coil 102, the clamping force applying device 106 and the outer sleeve 108, there is also an annular inner sleeve 110. The inner sleeve 110 is positioned between the heater coil 102 and the outer surface 103 of the nozzle body 30 and is in contact with the outer surface 103 of the nozzle body 30. The inner sleeve 110 is preferably formed from a material having a thermal expansion coefficient which is at least equal to the thermal expansion coefficient of the material forming the nozzle body 30. Suitable materials for the sleeve 110 include high conductivity materials such as copper, copper alloys, beryllium copper alloys, aluminum and aluminum alloys. Preferably, the inner sleeve 110 has an axial slot 114.

The heater clamping assembly of FIG. 2B is particularly suitable for fast removal of heaters that have to be replaced in remote heating sites where no tools are available to wrap the heater coil 102 around the nozzle body 30.

In the assembly of FIG. 2B, the clamping force applied by the device 106 causes the slot 114 to close slightly and the internal diameter of the sleeve 110 to be reduced. As a result, the inner sleeve 110 is placed into tight contact with the nozzle body 30. When heat is applied to the thermoplastic material in the nozzle body 30, both the nozzle body 30 and the inner sleeve 110 will expand. The sleeve 108 will also expand, but to a lesser extent due to its lower thermal expansion coefficient. As in the embodiment of FIG. 2A, the sleeve 108 limits the expansion of the device 106. This amplifies the clamping force that is applied to the heater 102 by redirecting a portion of the clamping force in a radially inward direction. The radially inward application of the clamping force will cause the sleeve 110 to want to reduce its diameter. This results in tight contact between the heating element 102 and the inner sleeve 110 and also tight contact between the inner sleeve 110 and the nozzle body 30.

FIG. 2C illustrates a heater clamping assembly similar to that shown in FIG. 2A. It differs however in the use of an innovative nozzle body 30 having grooves 101 to locate the coil heater 102. The grooves 101 allow wrapping of the heater in a more stable manner and increased contact surface. Thus, thermal transfer is improved. While grooves have been known in the art for integrated heaters, they are not known for removable heaters such as coil heater 102. While FIG. 2C illustrates the grooves 101 in nozzle body 30, the inner sleeve 110 in the embodiment of FIG. 2B could be provided with grooves as well.

The clamp force generating device 106 used in the embodiments of FIGS. 2A, 2B, and 2C may be a mechanically deformable or elastic element, such as any suitable two-dimensional (2D) or three-dimensional (3D) profiled plan stripe or sheet. In a preferred embodiment, this elastic element is an innovative 2D wave spring, made of a material displaying spring like characteristics under mechanical pressure. The mechanically deformable element can be made of any material that can cyclically change its shape and return to its initial position or remain deformed solely under constant pressure. For example, the mechanically deformed element could be formed from pre-hardened stainless steel. If the device 106 is formed by a wave spring, the pitch P of the wave spring may be between about 1.0 mm. to about 4.0 mm. As previously discussed, the purpose of the device 106 is to apply a clamping force which pushes the heater 102 into tight contact with the outer surface 103 of the nozzle body 30 and/or the sleeve 110.

Figure 3A:
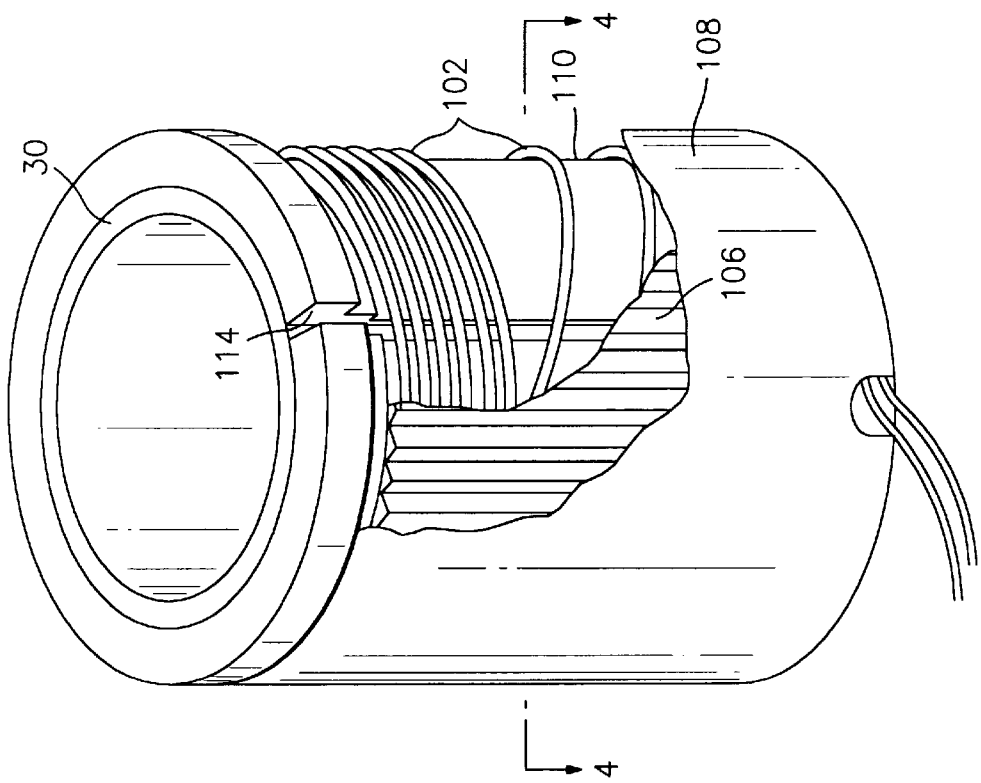
FIG. 3A is a perspective view of a fourth embodiment of a clamping system in accordance with the present invention using a wave spring element.
Figure 4:
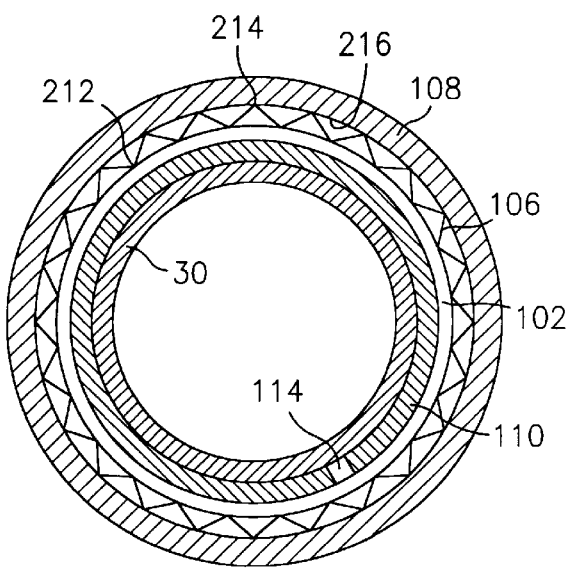
FIG. 4 is a sectional view of the clamping system of FIG. 3A taken along lines 4—4.

FIGS. 3A and 4 illustrate the actual use of the wave spring in the embodiment already shown in FIG. 2B of a heater clamping assembly in accordance with the present invention. This embodiment also includes an inner sleeve 110 in contact with the nozzle body 30, a heater coil 102 surrounding the inner sleeve 110, a device 106 for applying a clamping force to the heater coil 102 and an outer sleeve 108 which acts as a retaining member and limits the radially outward expansion of the device 106. As in the embodiment of FIG. 2B, the inner sleeve 110 is formed from a material having thermal expansion coefficient at least as high as the thermal expansion coefficient of the material forming the nozzle body 30 and the outer sleeve 108 is formed from a material having a thermal expansion coefficient less than the thermal expansion coefficients of the inner sleeve 110 and the nozzle body 30.

Figure 5A:
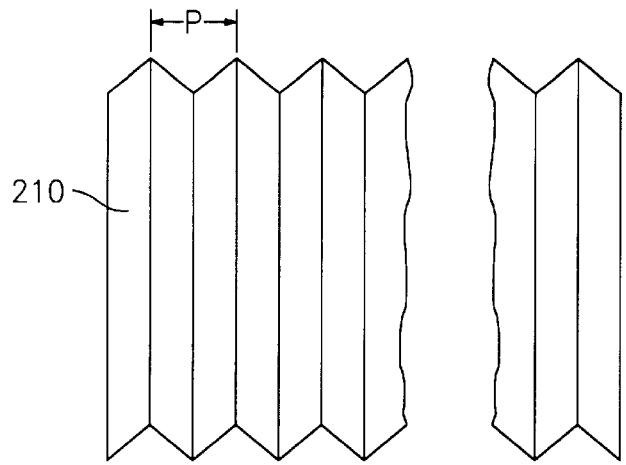
FIG. 5A is a top view of the wave spring element used in the embodiment of FIG. 3.

In the embodiment of FIGS. 3A and 4, the device 106 for applying the clamping forces is preferably formed from a profiled sheet 210 of deformable material such as that shown in FIG. 5A. As can be seen from FIG. 4, the sheet 210 when used for the device 106 has a lower edge which has a plurality of peaks 212 which contact the heater coil 102 in a plurality of spaced locations and an upper edge which has a plurality of peaks 214 which contact the inner surface 216 of the outer sleeve 108 in a plurality of spaced locations. The peak to peak distance of the sheet 210 is known as the pitch P. While any desired pitch may be used for the sheet 210, it has been found that a pitch P in the range of from about 1.0 mm to about 4.0 mm is particularly useful.

Figure 5B:
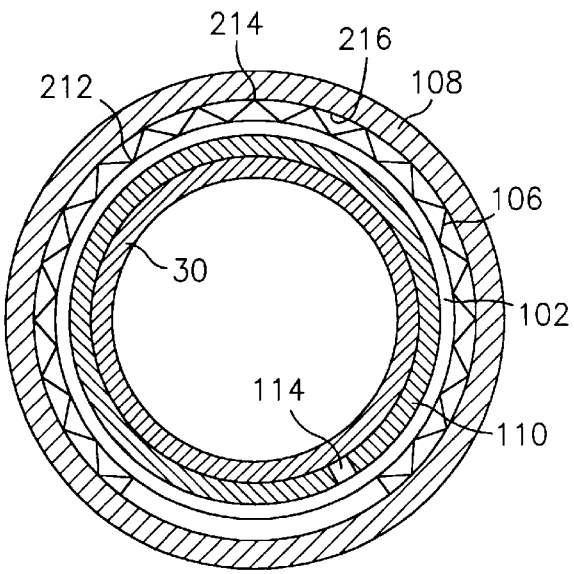
FIG. 5B illustrates yet another embodiment of a clamping system in accordance with the present invention.
Figure 5C:
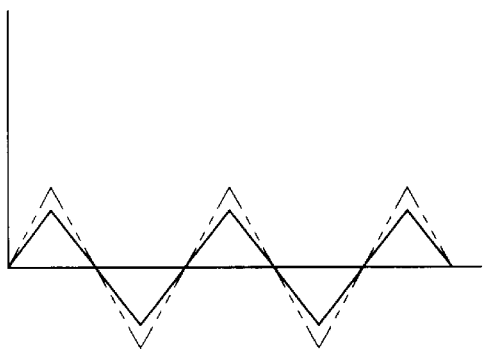
FIG. 5C illustrates the thermal expansion of the wave spring element used in the embodiment of FIG. 3.

As shown in FIG. 4, the device 106 formed from profiled sheet 210 may completely surround the heater coil 102, the inner sleeve 110, and the nozzle body 30. Alternatively, the device 106 formed from profiled sheet 210, as shown in FIG. 5B, may surround only a portion of the heater coil 102, the inner sleeve 110 and the nozzle body 30. In the case where the profiled sheet device only partially surrounds the nozzle body 30, any thermal expansion caused by heating the thermoplastic material acts in two directions, circumferential and radial. In the radial direction, the applied clamping force is at a level sufficient to hold the heater in place. In the case where the profiled sheet device completely surrounds the nozzle body 30, as in the embodiment of FIG. 4, any thermal expansion caused by heating the thermoplastic material occurs in the radial direction. As a result, the thermal expansion will cause the peaks 212 and 214 to want to increase in height as shown in FIG. 5C. The resulting applied clamping force will be higher in the radial direction towards the heater 102 because the outer sleeve 108 limits any outward expansion of the profiled sheet device 106.

Figure 5D:
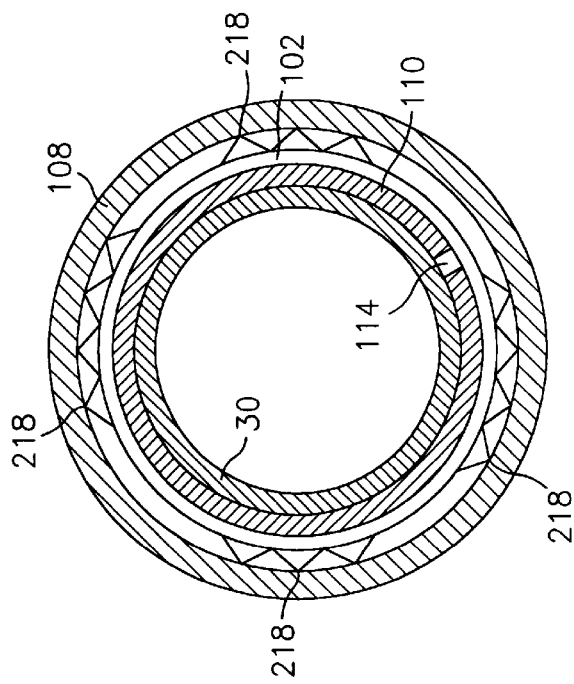
FIG. 5D is a sectional view of yet another embodiment of a clamping system in accordance with the present invention.
Figure 6B:
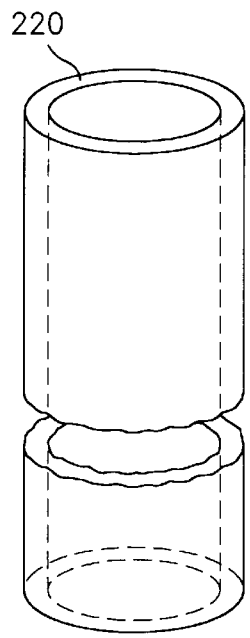
FIGS. 6B and 6C illustrate deformable elements which may be used in a clamping system in accordance with the present invention.
Figure 6C:
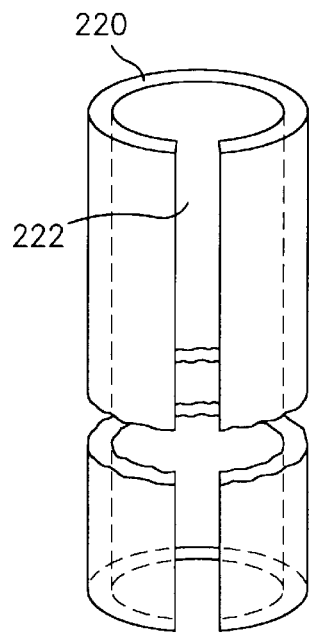

As shown in FIG. 5D, if desired, the device 106 may be formed from a plurality of profiled sheet segments 218 spaced about the periphery of the heater coil 102, the inner sleeve 110 and the nozzle body 30.

FIG. 3B illustrates another variation of the heater and clamping means shown in FIG. 3A. In this variation, the heater 102' is wrapped in a serpentine fashion along the nozzle body 30. The wave spring is replaced by one or more replaceable hoop means 105 which have spring like characteristics and thus hold the heater 102' in good thermal contact with the body. FIG. 10 illustrates a top view of one of the hoop means 105.

Figure 6A:
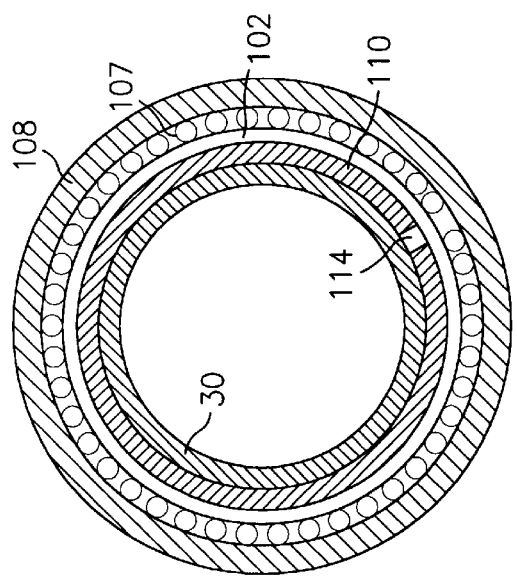
FIG. 6A is a sectional view of still another embodiment of a clamping system in accordance with the present invention.

FIG. 6A illustrates yet another embodiment of a heater clamping assembly in accordance with the present invention. As shown therein, the device 106 may be formed from a plurality of elongated, deformable, elastic, hollow, thin wall tube structures 107 positioned between the outer sleeve 108 and the heater coil 102. The tubular structures 107 each have a longitudinal axis which extends in same direction as the longitudinal axis of the nozzle body 30. The tubular structures 107 operate as in the previously described clamping assembly embodiments to apply a clamping force to the heater coil 102 and the inner sleeve 110 to hold the heater coil and the inner sleeve in good thermal contact with the nozzle body 30.

If desired, the plurality of tubes 107 in the embodiment of FIG. 6A may be in the form of a cylindrically shaped tube 220 made from a deformable, elastic, hollow, thin wall material. Alternatively, the tube 220 may have a longitudinally extending slot 222 therein.

FIG. 8A illustrates yet another heating clamping assembly in accordance with the present invention. As shown in this Figure, the nozzle body 30 is in contact with a hollowed inner sleeve 110 having a circumferential groove 224. The inner sleeve 110 may completely surround the nozzle body, but preferably has an axially extending slot (not shown) such as slot 114 shown in FIG. 2B. The heater coil 102 is positioned within the groove 224. As before, the inner sleeve 110 is formed from a material having a thermal expansion coefficient which is at least as high as the thermal expansion coefficient of the material forming the nozzle body 30. The assembly also includes a hollowed outer sleeve 108 formed from a material having a thermal expansion coefficient less than the thermal expansion coefficients of the inner sleeve 110 and the nozzle body 30. The outer sleeve 108 has a circumferentially extending groove 226 and a membrane 228 which forms a chamber 230 within the groove 226. In order to apply a clamping force so as to hold the heater coil 102 against the sleeve 110 and hold the sleeve 110 against the nozzle body 30, an expandable material is introduced into the chamber 230. The expandable material may be liquid or gas introduced into the chamber' 230 using any suitable means (not shown) known in the art. Alternatively, the expandable material may be any suitable material known in the art which expands upon the application of heat. In operation, the expandable material causes the membrane 228 to deflect radially inward and thereby apply the desired clamping force. This can be achieved at cold and warm conditions. In cold conditions the expandable liquid or gas is introduced in chamber 234 under higher pressure. In warm conditions, the air or gas will slightly expand and thus will generate an increased clamping force.

Figure 8B:
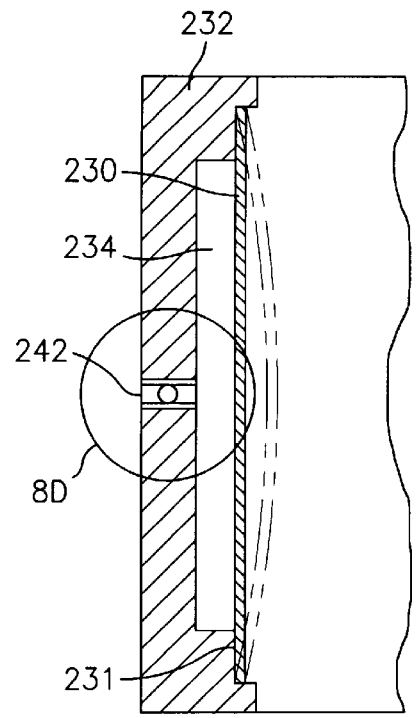
FIGS. 8B and 8C illustrate still other embodiments of a clamping system in accordance with the present invention.
Figure 8D:
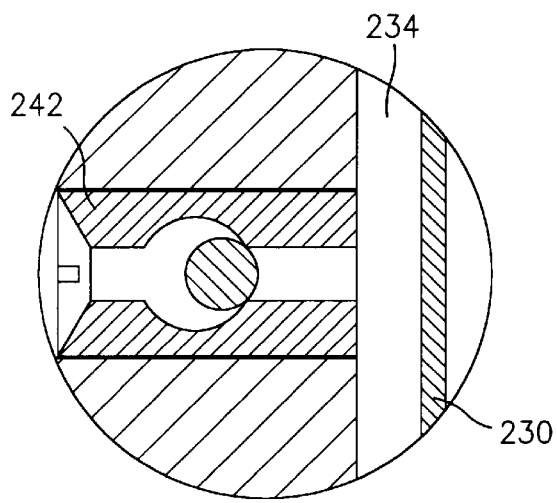
FIG. 8D is an enlarged view of the valve arrangement in the embodiment of FIG. 8B.
Figure 8C:
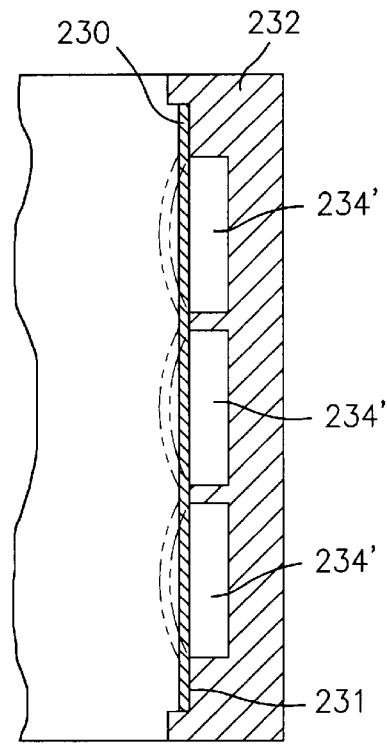

FIGS. 8B–8D illustrate still other embodiments of a heater clamping assembly in accordance with the present invention. In both of these embodiments, the mechanism for applying the clamping force to the heater coil (not shown) and the inner sleeve (not shown), if used, is a deformable or flexible membrane 230 attached to an outer retaining element or sleeve 232. As shown in FIGS. 8B and 8C, the sleeve 232 is provided with one or more circumferential grooves forming chamber(s) 234 or 234'. As in the embodiment of FIG. 8A, an expandable material such as a gas, liquid or any other material known in the art which will expand on the application of heat is introduced into the chamber(s) 234 or 234'. When a gas or liquid is used to cause the membrane 230 to deform or flex, any suitable means known in the art, such as valve 242, may be used to introduce the gas or liquid into the chamber(s) 234 or 234'. If a non-liquid or non-gaseous expandable material is used in the chamber(s) 234 or 234', the expandable material may be pre-loaded into the chamber(s) 234 or 234'. In such a system, the membrane 230 may be soldered to surface 231.

The embodiments of FIGS. 8A, 8B and 8C are particularly advantageous in that one can obtain a clamping force in cold conditions as well as in warm conditions. This is because the expansion of chambers 234 and 234' do not require the application of heat. The application of heat increases the applied clamping force because the material in chambers 230, 234 and 234' expands to a greater degree.

Figure 9:
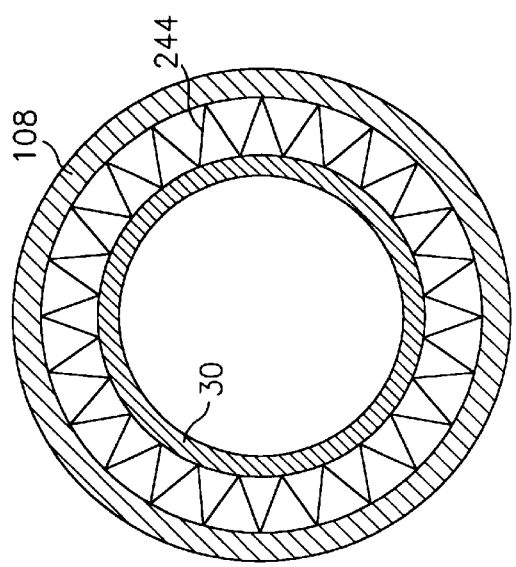
FIG. 9 illustrates a heater clamping system wherein the heater and the clamping force applying means are combined in a signal element.

In a further embodiment of the invention, it is possible to have a clamping assembly wherein a single element acts as both the heater and the clamp force applying device. Such a construction is shown in FIG. 9. As shown therein, the nozzle body 30 is surrounded by a retaining element or sleeve 108 and a profiled element 244. In this embodiment, the profiled element 244 acts as both the heater and the clamp force applying means. As before, the retaining element 108 is formed from a material having a thermal expansion coefficient which is lower than the thermal expansion coefficient of the material forming the nozzle body 30. The profiled element 244 is preferably formed from a deformable, relatively thin material having spring like characteristics and good electrical resistivity properties. In a preferred embodiment, the material forming the profiled element 244 also has a thermal expansion coefficient which is at least equal to the thermal expansion coefficient of the material forming the nozzle body 30. As before, the retaining element 108 acts to limit the outward expansion of the profiled element 244, thereby redirecting the clamping force so that the profiled element 244 is held in good thermal contact with the nozzle body 30.

The heater clamping assemblies of the present invention provide numerous advantages. For example, the assemblies are made up of a combination of simple elements that use both thermal expansion and elastic deformation to apply the desired clamping force between the heater and the nozzle housing. The thermal expansion has a radial and a longitudinal component while the elastic deformation has a radial component only. The clamping assemblies described herein are adaptable to a broad range of nozzle geometries and sizes, are operative for various processing conditions, and do not require accurate and expensive machining of the parts. The clamping assemblies can also hold a sensor in addition to the resistive heater, such as a thermocouple, in the same tight thermal contact with the nozzle housing using the same clamping elements.

Still other advantages include the fact that the clamping force is not dependent on the geometrical tolerances of the thermally expandable components and is present at room temperature conditions (cold) as well as during the injection process (hot). The clamping assemblies of the present invention also provide increased clamping force and heat transfer contact by using a mechanically deformable, elastic element between two thermally expandable elements. Still further, there is reduced thermal contact between the electrical resistive element and the deformable mechanical element which reduces heat loss. The various clamping assemblies also allow the heater to be removed if necessary and are easy to manufacture, assemble, service and customize.

Yet other advantages are that the clamping assemblies of the present invention do not consume significant space in order to create the clamping effect, nor does they require a tool to generate the clamping force, when being installed on a nozzle body.

Still another advantage of the clamping assemblies is that the various components, i.e. the heating elements, the inner annular sleeve, the outer annular sleeve, and the clamping force applying devices may be designed to be easily removed.

Figure 7A:
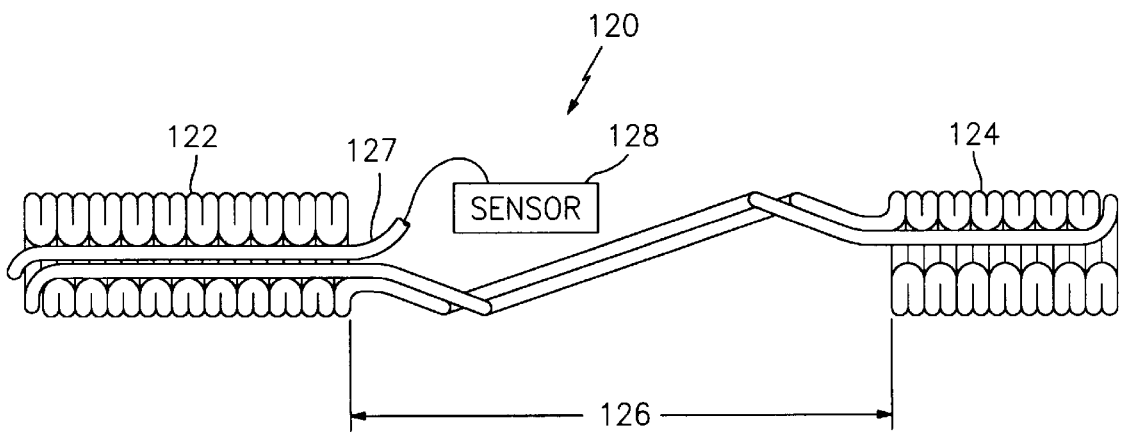
FIG. 7A is a perspective view of a heater coil having a sensor incorporated therein in accordance with the present invention.

While the invention of the present invention has been described with the heater 102 being a coil heater, it is possible to use the clamping arrangements described herein to hold an innovative specialized heater. Such a specialized heater 120 is called a split coil heater and is shown in FIGS. 7A–7C. When installed, the split coil heater 120 does not completely surround the nozzle body 30. In fact, there is an opening Y. It has been found that this type of heater will provide limited grip-like characteristics. Further, the opening Y provides space for locating, in the opening, an elongated sensor that would otherwise have to be placed on top of the heater.

As shown in FIGS. 7A–7C, the heater coil 120 has a plurality of spaced apart fingers 125 which can be fabricated into a substantially C-shaped configuration wherein the heater 120 has a first coiled portion 122 and a second coiled portion 124 spaced from the first coiled portion. A removable sensor 128, such as a thermocouple, thermistor, an optical fiber cable, or other temperature sensing element, may be placed in the gap 126 between the coiled portions 122 and 124. As shown in FIG. 7B, a wire or optical fiber cable 127 may pass through the opening Y between the ends of the C-shaped fingers 125 and be connected to the sensor 128. By fabricating the fingers 125 into the substantially C-shaped configuration, the heater coil 120, when positioned around the nozzle body 30 or an inner sleeve element 110 will grip the nozzle body or inner sleeve element.

By providing a heater coil arrangement such as that shown in FIGS. 7A–7C, the overall diameter of the heater-sensor sensor combination is the same as it would be without the sensor. Still further, the clamping arrangements of the present invention would be used to hold both the heating coil and the sensor in contact with the nozzle body.

It is apparent that there has been provided in accordance with the present invention a hot runner heater clamp which fully satisfies the means, objects and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and the broad scope of the appended claims.

What is claimed is:

1. A system for clamping an object to a heated cylindrical member which comprises:
    means for applying a clamping force to said object so as to hold said object in contact with said heated cylindrical member; and
    means for limiting expansion of said clamping force applying means in a first direction so as to amplify and redirect said clamping force for holding said object in contact with said heated cylindrical member, said expansion limiting means surrounding said clamping force applying means and being in contact with an outer edge of said clamping force applying means.

2. The system of claim 1 wherein said clamping force applying means comprises at least one mechanically deformable element.

3. The system of claim 2 wherein said at least one mechanically deformable element has spring characteristics under mechanical pressure.

4. The system of claim 2 wherein said at least one mechanically deformable element comprises a sheet material having spring characteristics, said sheet material at least partially surrounding said object.

5. The system of claim 4 wherein said sheet material comprises a profiled sheet material having spring characteristics.

6. The system of claim 2 wherein said at least one mechanically deformable element comprises a plurality of elastic rod members surrounding said object.

7. The system of claim 2 wherein said at least one mechanically deformable element comprises a cylinder which at least partially surrounds said object, said cylinder being formed from a deformable, elastic, thin walled material.

8. The system of claim 1 further comprising:
    said cylindrical member being formed from a material having a first thermal expansion coefficient; and
    said expansion limiting means comprising an annular member formed from a material having a second thermal expansion coefficient, which second thermal expansion coefficient is lower than said first thermal expansion coefficient.

9. The system of claim 1 wherein said expansion limiting means comprises an annular metallic sleeve, said annular metallic sleeve surrounding said clamping force applying means and limiting the expansion of said clamping force applying means in a radial direction away from said object to be held in contact with said cylindrical member.

10. The system of claim 1 wherein said cylindrical member comprises a heated nozzle in an injection molding machine.

11. The system of claim 10 wherein said object comprises at least one of a heater, a sensor, and a thermocouple.

12. The system of claim 1 wherein at least one of the object, the clamping force applying means, and the expansion limiting means is removable.

13. The system of claim 1 wherein said cylindrical member comprises a hot runner channel in an injection molding machine.

14. The system of claim 2 wherein said clamping force applying means comprises a wave spring.

15. The system of claim 1 wherein said object comprises a heater positioned between said clamping force applying means and said cylindrical member and wherein said means for limiting expansion limits expansion of said clamping force applying means in a radially outward direction and redirects said clamping force generated by said clamping force applying means in a radially inward direction toward said heater and said cylindrical member, thereby holding said heater against said cylindrical member.

16. A system for clamping an object to a heated cylindrical member which comprises:
    means for applying a clamping force to said object so as to hold said object in contact with said heated cylindrical member;

means for limiting expansion of said clamping force applying means in a first direction so as to amplify and redirect said clamping force for holding said object in contact with said heated cylindrical member, said expansion limiting means being in contact with said clamping force applying means;

said clamping force applying means comprising at least one mechanically deformable element;

said at least one mechanically deformable element comprising a flexible membrane;

said expansion limiting means comprises an annular sleeve; and said annular sleeve having at least one circumferential groove machined into an interior surface.

17. The system of claim 16 further comprising:

at least one expandable chamber defined by said flexible membrane and said at least one circumferential groove; and an expandable material within said at least one expandable chamber for causing said flexible membrane to flex and thereby apply said clamping force to said object.

18. A system for clamping an object to a heated cylindrical member which comprises:

means for applying a clamping force to said object so as to hold said object in contact with said heated cylindrical member;

means for limiting expansion of said clamping force applying means in a first direction so as to amplify and redirect said clamping force for holding said object in contact with said heated cylindrical member, said expansion limiting means being in contact with said clamping force applying means;

an annular inner sleeve located between said heated cylindrical member and said object;

said clamping force applying means comprising at least one mechanically deformable element surrounding said object; and said expansion limiting means comprising an annular outer sleeve located around said at least one mechanically deformable element.

19. The system of claim 18 further comprising:

said annular inner sleeve being formed from a material having a first thermal expansion coefficient; and said annular outer sleeve being formed from a material having a second thermal expansion coefficient, which second thermal expansion coefficient is less than said first thermal expansion coefficient.

20. The system of claim 18 wherein said annular inner sleeve is in contact with said cylindrical member and is positioned between said object and said cylindrical member.

21. The system of claim 18 wherein said annular inner sleeve is formed from a high conductivity material selected from the group consisting of copper, copper alloys, beryllium copper alloys, aluminum, and aluminum alloys and said annular outer sleeve is formed from a material selected from the group consisting of titanium, titanium alloys, stainless steels, ceramic material, and iron alloys.

22. The system of claim 18 wherein said annular inner sleeve has an axial slot and wherein the clamping force applied by the at least one mechanically deformable element causes the axial slot to close and an internal diameter of the annular inner sleeve to be reduced, thereby placing said annular inner sleeve into tight contact with said cylindrical member.

* * * * *